United States Patent
Domanski et al.

(10) Patent No.: US 9,848,205 B2
(45) Date of Patent: Dec. 19, 2017

(54) METHOD FOR PREDICTIVE CODING OF DEPTH MAPS WITH PLANE POINTS

(71) Applicant: Politechnika Poznanska, Poznan (PL)

(72) Inventors: Marek Domanski, Poznan (PL); Tomasz Grajek, Poznan (PL); Damian Karwowski, Poznan (PL); Krzysztof Klimaszewski, Murowana Goslina (PL); Olgierd Stankiewicz, Poznan (PL); Jakub Stankowski, Poznan (PL); Krzysztof Wegner, Murowana Goslina (PL)

(73) Assignee: POLITECHNIKA POZNANSKA, Poznan (PL)

( * ) Notice: Subject to any disclaimer, the term of this patent is extended or adjusted under 35 U.S.C. 154(b) by 10 days.

(21) Appl. No.: 14/753,011

(22) Filed: Jun. 29, 2015

(65) Prior Publication Data

US 2016/0381387 A1  Dec. 29, 2016

(30) Foreign Application Priority Data

Jun. 24, 2015  (PL) ......................... 412833

(51) Int. Cl.
  H04N 7/12  (2006.01)
  H04N 19/593  (2014.01)
  H04N 19/136  (2014.01)
  H04N 19/176  (2014.01)
  H04N 19/597  (2014.01)

(52) U.S. Cl.
  CPC ......... H04N 19/593 (2014.11); H04N 19/136 (2014.11); H04N 19/176 (2014.11); H04N 19/597 (2014.11)

(58) Field of Classification Search
  CPC .................................................... H04N 19/593
  USPC ................................................. 375/240.08
  See application file for complete search history.

(56) References Cited

U.S. PATENT DOCUMENTS

2013/0250060 A1*  9/2013  Andersson ............. G06T 9/004
                                                              348/43

OTHER PUBLICATIONS

P. Merkle et al; "The effects of multiview depth video compression on multiview rendering" in Signal Processing: Image Communication 24 (2009) 73-88.

* cited by examiner

Primary Examiner — Richard Torrente
(74) Attorney, Agent, or Firm — Mark M. Friedman

(57) ABSTRACT

A method for predictive encoding of a depth map, includes the steps of receiving a depth map; dividing the depth map to blocks; performing quad-tree decomposition of the depth map to sub-blocks; approximating each of the sub-blocks by a plane, wherein the plane is associated with three plane points; and determining an order of coding of the sub-blocks; and providing an encoded depth map in a form of a set of planes defined by parameters. The method includes, while encoding consecutive sub-blocks: calculating predictors for the plane points of the currently-encoded sub-block (C); calculating differences between the actual values of the plane points and the values of the corresponding predictors; and providing the parameters of the plane for the currently-encoded sub-block (C) in form of the differences.

10 Claims, 4 Drawing Sheets

METHOD FOR PREDICTIVE CODING OF DEPTH MAPS WITH PLANE POINTS

TECHNICAL FIELD

The present disclosure relates to predictive coding of depth maps for three-dimensional imaging systems.

BACKGROUND

In three-dimensional imaging systems, a popular representation of a scene is MultiView-plus-Depth (MVD), in which information about three-dimensional structure of a scene is stored in form of depth maps. Basing on depth maps and corresponding videos (so called texture views), a virtual view can be synthesized, typically in between of the source views. The use of MVD leads to a simple and straightforward approach to view synthesis, which is to employ Depth-Image-Based Rendering (DIBR).

View synthesis is expected to be realized by user-side devices, like 3D displays, mobile phones, etc. Therefore there is a need for fast, computationally efficient view synthesis algorithms, which desirably could be seamlessly implemented in hardware.

A publication "Platelet-based coding of depth maps for the transmission of multiview images" (by Y. Morvan, P. H. N. de With, and D. Farin, in Proceedings of SPIE: Stereoscopic Displays and Applications, 2006, vol. 6055) discloses an algorithm that models depth maps using piecewise-linear functions (platelets). To adapt to varying scene detail, a quadtree decomposition is employed that divides the image into blocks of variable size, each block being approximated by one platelet. In order to preserve sharp object boundaries, the support area of each platelet is adapted to the object boundary. The subdivision of the quadtree and the selection of the platelet type are optimized such that a global rate-distortion trade-off is realized.

A publication "Fast View Synthesis using platelet-based depth representation" (by K. Wegner, O. Stankiewicz. M. Domanski, in 21th International Conference on Systems, Signals and Image Processing, IWSSIP 2014. Dubrovnik, Croatia, May 2014) discloses an approach to speeding up the view synthesis process that exploits depth modeling—the depth data is divided into blocks of various sizes and modelled as planes. In such case only 4 corners of each block need to be transformed during view synthesis, instead of transforming every pixel in the block. This way depth data is adaptively simplified.

There is a need to further improve the existing methods for predictive coding of depth maps, in particular in order to reduce the number of transmitted data and improve the compression ratio.

SUMMARY

There is presented herein a method for predictive encoding of a depth map, comprising the steps of: receiving a depth map; dividing the depth map to blocks, performing quad-tree decomposition of the depth map to sub-blocks; approximating each of the sub-blocks by a plane, the plane being associated with three plane points ($p_0$, $p_1$, $p_2$). The method further comprises: determining an order of coding of the sub-blocks; while encoding consecutive sub-blocks: calculating predictors ($\hat{p}_0$, $\hat{p}_1$, $\hat{p}_2$) for the plane points ($p_0$, $p_1$, $p_2$) of the currently-encoded sub-block (C); calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$); providing the parameters of the plane for the currently-encoded sub-block (C) in form of the differences ($\Delta p_0$, $\Delta p_1$, $\Delta p_2$); and providing an encoded depth map in a form of a set of planes defined by parameters.

The method may comprise calculating predictors ($\hat{p}_0$, $\hat{p}_1$, $\hat{p}_2$) for the plane points ($p_0$, $p_1$, $p_2$) of the currently-encoded sub-block (C) on the basis of the values of the plane points ($p^R_0$, $p^R_1$, $p^R_2$) for planes corresponding to earlier-encoded sub-blocks.

The earlier-encoded sub-blocks can be adjacent to the currently encoded sub-block.

R may $\in$ {LT, L, LB, T, RT}.

The method may comprise specifying predictors ($\hat{p}_0$, $\hat{p}_1$, $\hat{p}_2$) for the plane points ($p_0$, $p_1$, $p_2$) of the currently-encoded sub-block (C) on the basis of a predefined value.

The order of coding of the sub-blocks can be selected from the group comprising: z-order, raster scan order, diagonal scan order, zigzag scan order.

The sub-blocks may have a rectangular shape with a size of N1×N2, wherein at least one of N1, N2 is higher than 1.

The sub-blocks may have a square shape.

There is also disclosed a computing device program product for depth-image-based rendering, the computing device program product comprising: a non-transitory computer readable medium; first programmatic instructions for receiving a depth map; second programmatic instructions for dividing the depth map to blocks; third programmatic instructions for performing quad-tree decomposition of the depth map to sub-blocks; fourth programmatic instructions for approximating each of the sub-blocks by a plane, the plane being associated with three plane points ($p_0$, $p_1$, $p_2$); fifth programmatic instructions for determining an order of coding of the sub-blocks; sixth programmatic instructions for, while encoding consecutive sub-blocks: calculating predictors ($\hat{p}_0$, $\hat{p}_1$, $\hat{p}_2$) for the plane points ($p_0$, $p_1$, $p_2$) of the currently-encoded sub-block (C); calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$); providing the parameters of the plane for the currently-encoded sub-block (C) in form of the differences ($\Delta p_0$, $\Delta p_1$, $\Delta p_2$); and seventh programmatic instructions for providing an encoded depth map in a form of a set of planes defined by parameters.

There is also disclosed a system for predictive encoding of a depth map, the system comprising: a data bus communicatively coupling components of the system; a memory for storing data; a controller configured to perform the steps of: receiving a depth map; dividing the depth map to blocks; performing quad-tree decomposition of the depth map to sub-blocks; approximating each of the sub-blocks by a plane, the plane being associated with three plane points ($p_0$, $p_1$, $p_2$); determining an order of coding of the sub-blocks; while encoding consecutive sub-blocks: calculating predictors ($\hat{p}_0$, $\hat{p}_1$, $\hat{p}_2$) for the plane points ($p_0$, $p_1$, $p_2$) of the currently-encoded sub-block (C); calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$); providing the parameters of the plane for the currently-encoded sub-block (C) in form of the differences ($\Delta p_0$, $\Delta p_1$, $\Delta p_2$); and providing an encoded depth map in a form of a set of planes defined by parameters.

BRIEF DESCRIPTION OF FIGURES

The present method is shown by means of exemplary embodiment on a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities lake the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

The present disclosure is related to representation of depth data in a simplified manner, wherein instead of dense, regularly sampled pixels of depth map, rectangular blocks of depth pixels are modelled with flat planes, as described in the "Fast View Synthesis using platelet-based depth representation" publication mentioned in the background section. The flat planes are described by four corners, therefore the complexity of view synthesis process is significantly reduced—instead of pixel by pixel transformation, plane-model-based transformation can be used.

Figure 5:
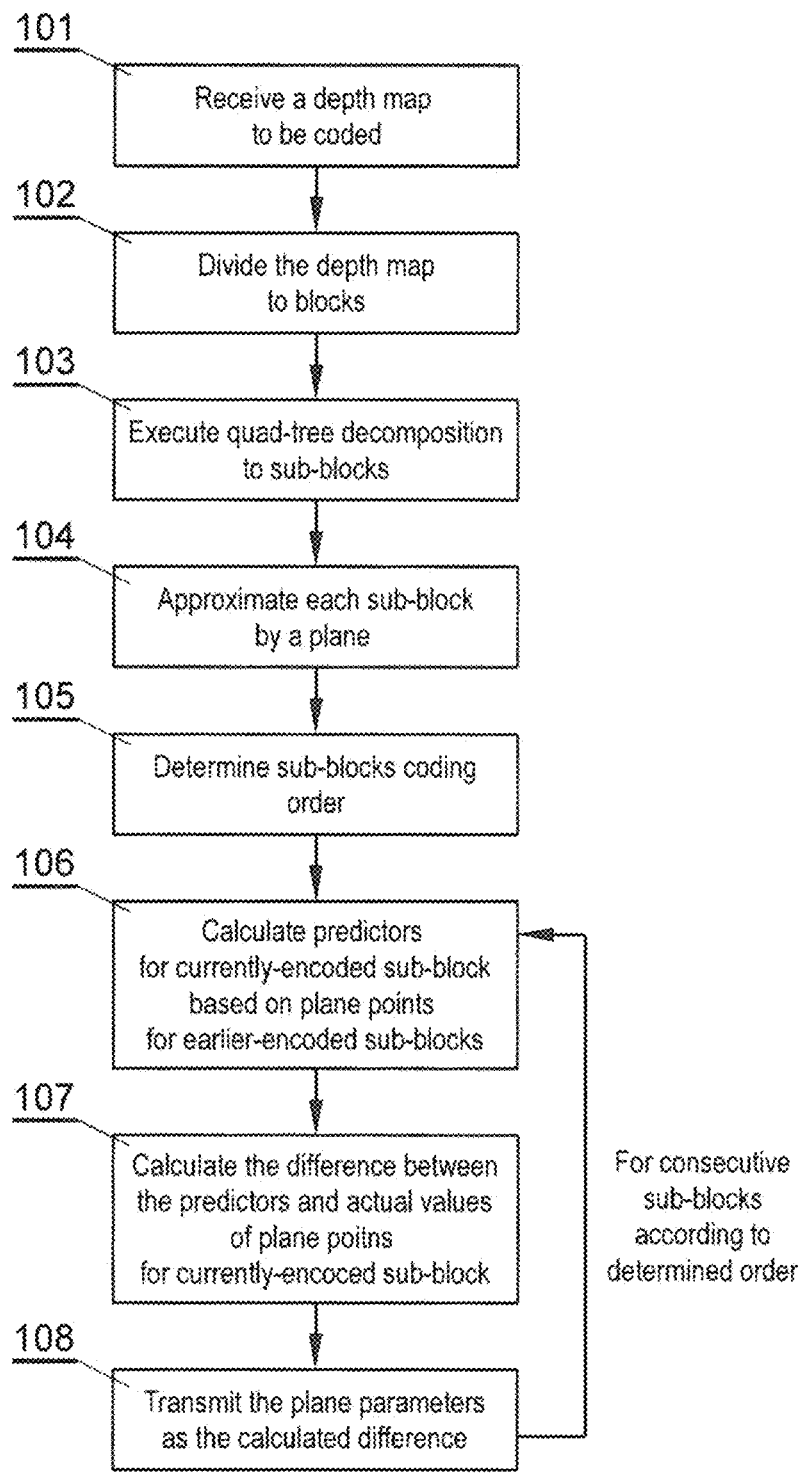
FIG. 5 shows schematically a method for depth map encoding.

The method is performed according to the flow diagram of FIG. 5.

The depth map received in step 101 is divided, in step 102, into non-overlapping blocks having a size of M×M. Each M×M block of the depth map is adaptively divided in a quadtree decomposition process, in step 103, to sub-blocks having a size N×N in the range from M×M to 2×2. In alternative embodiments, the depth map can be divided into non-square blocks, for example rectangular blocks having a size of M1×M2. Moreover, in alternative embodiments the blocks can be divided into non-square sub-blocks, for example rectangular sub-blocks having a size of N1×N2, wherein at least one of N1, N2 is higher than 1. For the sake of simplicity and clarity only, the presented embodiment is related to square blocks and sub-blocks.

Figure 1:
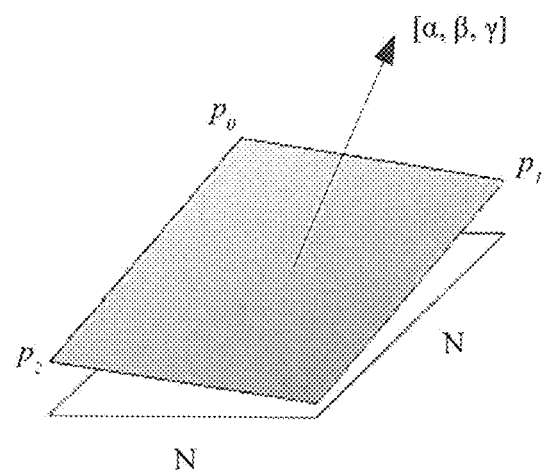
FIG. 1 shows an example of approximation of a sub-block of a depth map with a plane.

The depth map in each sub-block is approximated in step 104 by a plane, as shown in FIG. 1.

Each plane, such as shown in FIG. 1, is described by an equation $$d(x,y) = \alpha \cdot x + \beta \cdot y + \gamma$$

wherein d(x,y) is the value of the depth map at point x, y of the particular sub-block having a size of N×N. The values x and y are from 0 to N−1.

A coder that transmits the depth map in a form of a set of planes, must transmit for each block a tree defining the decomposition of the depth map block to sub-blocks. For each sub-block, parameters α, β, γ defining the plane must be transmitted.

As shown in FIG. 1, each sub-block may have three points: $p_0$, $p_1$, $p_2$ specified that define the plane, and therefore allow to determine the parameters α, β, γ as follows:

$$\alpha = \frac{p_1 - p_0}{N - 1} \quad \beta = \frac{p_2 - p_0}{N - 1} \quad \gamma = p_0$$

This allows to transmit the value of the depth map at the points $p_0$, $p_1$, $p_2$ instead of parameters α, β, γ.

Figure 2:
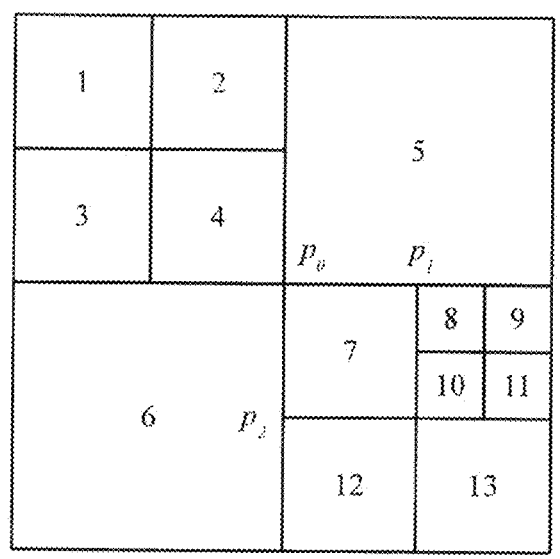
FIG. 2 shows the order of coding of sub-blocks of the coded block of the depth map.

In one preferred embodiment, the sub-blocks of the coded depth map block can be coded according to the z-order determined in step 105, as shown in FIG. 2. In this order, each sub-block is adjacent to sub-blocks that have been encoded earlier. Alternative orders can be determined as well, such as a raster scan order, diagonal scan order, zigzag scan order.

Figure 3:
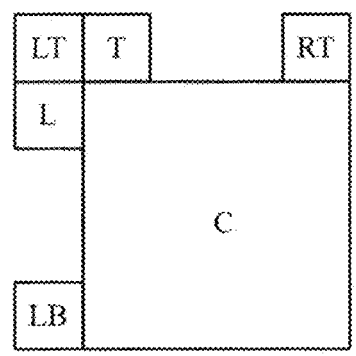
FIG. 3 shows the adjacent earlier-encoded sub-blocks for the currently-encoded sub-block.

FIG. 3 shows the adjacent earlier-encoded sub-blocks for the currently-encoded sub-block C: LeftTop (LT), Top (T), RightTop (RT), Left (L) and LeftBottom (LB).

The values $p_0$, $p_1$, $p_2$ for the currently-encoded sub-block can be predicted in step 106 (as predictors $\hat{p}_0$, $\hat{p}_1$, $\hat{p}_2$) on the basis of extension of planes defined by values $p^R_0$, $p^R_1$, $p^R_2$, in the earlier-encoded sub-blocks, wherein R∈{LT, L, LB, T, RT}. The prediction can be also made on the basis of a predefined value stored at the coder. Of course, the prediction is not done for the first sub-blocks in the coding order, which have no corresponding earlier-encoded sub-blocks.

Figure 4:
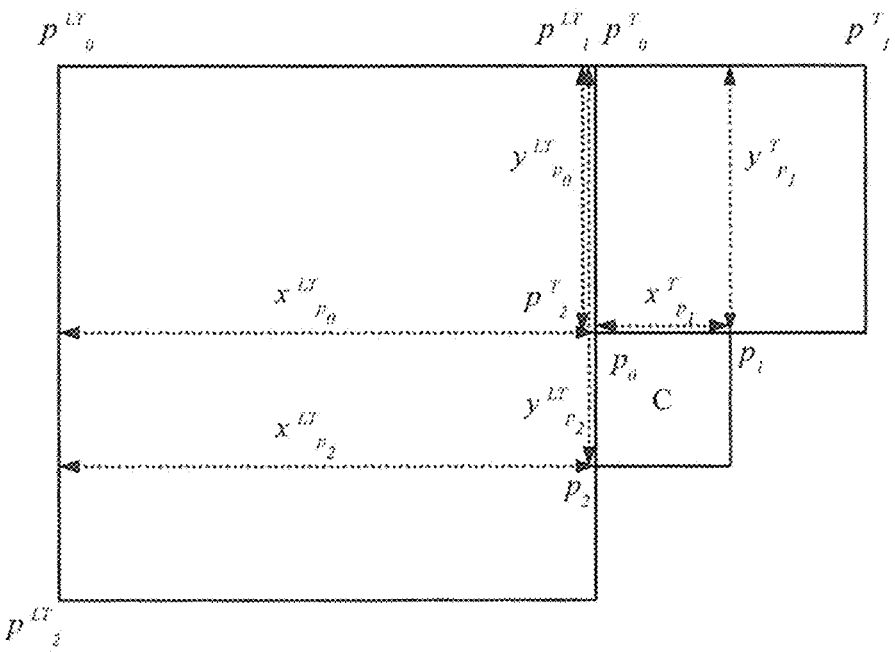
FIG. 4 shows coefficients for the currently-encoded sub-block.

For example, as shown in FIG. 4, the currently-encoded sub-block C can be adjacent to 2 earlier-encoded sub-blocks: LeftTop (LT), having dimensions of $N_{LT} \times N_{LT}$ and Top (T) having dimensions $N_T \times N_T$.

The position of point $p_0$ of the currently-encoded sub-block C with respect to the earlier-encoded sub-block LT is referenced as $x^{LT}_{p_0}$, $y^{LT}_{p_0}$.

The predictor $\hat{p}_0$ of the value of $p_0$ can be determined as the value of the depth map corresponding to the extension of plane ($p^{LT}_0$, $p^{LT}_1$, $p^{LT}_2$) defined for the earlier-encoded sub-block LT according the formula;

$$\hat{p}_0 = \frac{p_1^{LT} - p_0^{LT}}{N_{LT} - 1} \cdot x_{p_0}^{LT} + \frac{p_2^{LT} - p_0^{LT}}{N_{LT} - 1} \cdot y_{p_0}^{LT} + p_0^{LT}$$

The predictor $\hat{p}_2$ of the value of $p_2$ can be determined as the value of the depth map corresponding to the extension of plane ($p^{LT}_0$, $p^{LT}_1$, $p^{LT}_2$) defined for the earlier-encoded sub-block LT according to the formula:

$$\hat{p}_2 = \frac{p_1^{LT} - p_0^{LT}}{N_{LT} - 1} \cdot x_{p_2}^{LT} + \frac{p_2^{LT} - p_0^{LT}}{N_{LT} - 1} \cdot y_{p_2}^{LT} + p_0^{LT}$$

The predictor $\hat{p}_1$ of the value of $p_1$ can be determined as the value of the depth map corresponding to the extension of plane ($p^{T}_0$, $p^{T}_1$, $p^{T}_2$) defined for the earlier-encoded sub-block T according to the formula:

$$\hat{p}_1 = \frac{p_1^{T} - p_0^{T}}{N_{T} - 1} \cdot x_{p_1}^{T} + \frac{p_2^{T} - p_0^{T}}{N_{T} - 1} \cdot y_{p_1}^{T} + p_0^{T}$$

In the depth-map coding method according to the disclosure, the encoder transmits in step 108 the parameters of the plane for the currently-encoded sub-block C in form of the difference $\Delta p_0$, $\Delta p_1$, $\Delta p_2$ between the actual value of $p_0$, $p_1$, $p_2$ and the value of its corresponding predictor $\hat{p}_0$, $\hat{p}_1$, $\hat{p}_2$:

$\Delta p_0 = p_0 - \hat{p}_0$ $\Delta p_1 = p_1 - \hat{p}_1$ $\Delta p_2 = p_2 - \hat{p}_2$ For the first sub-blocks in the coding order, which have no corresponding earlier-encoded sub-blocks, the difference may correspond to the actual value of the plane points $p_0$, $p_1$, $p_2$, as the predictors may be assumed to have a zero value.

At the decoder, the actual parameters of the plane $p_0$, $p_1$, $p_2$ are calculated according to the above formula by adding to the received difference values the predictors calculated for the earlier-decoded sub-blocks for the currently decoded sub-block.

Figure 6:
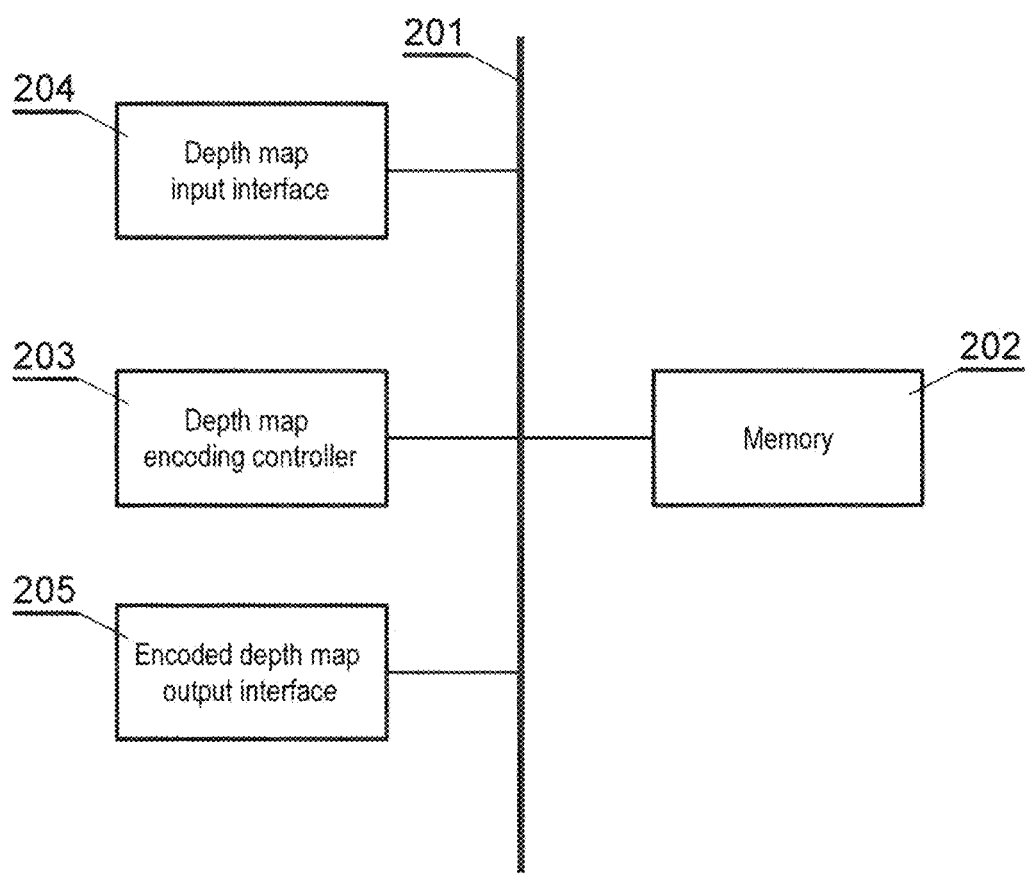
FIG. 6 shows a schematic of a depth map encoder.

FIG. 6 shows a schematic of a depth map encoder for performing the encoding method. The encoder may be realized using dedicated components or custom made FPGA or ASIC circuits. The encoder comprises a data bus (201) communicatively coupled to a memory (202) and the other elements of the encoder. The memory (202) may store computer program or programs executed by the depth map encoding controller (203) in order to execute steps of the method according to the present disclosure, in order to encode the depth map received via the input interface (204) and to output it via the output interface (205). The memory (202) may store any temporary data necessary to arrive at the final result of the method according to the present disclosure.

The present disclosure provides improved encoding efficiency of the depth map. Therefore, the method provides a useful, concrete and tangible result.

According to the present method, certain computer data are processed in a processing device according to FIG. 6. Therefore, the machine or transformation test is fulfilled and that the idea is not abstract.

It can be easily recognized, by one skilled in the art, that the aforementioned method for predictive encoding of a depth map may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the method presented herein has been depicted, described, and has been defined with reference to particular preferred embodiments, such references and examples of implementation in the foregoing specification do not imply any limitation on the method. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for predictive encoding of a depth map, comprising the steps of:
    receiving a depth map;
    dividing the depth map to blocks;
    performing quad-tree decomposition of the depth map to sub-blocks having a size of N1×N2 points wherein N1, N2 are higher than 1;
    approximating each of the sub-blocks by a plane d(x, y) described by an equation $d(x,y) = \alpha \cdot x + \beta \cdot y + \gamma$ wherein d(x, y) is the value of the plane at the point having coordinates (x, y) and wherein x ranges from 0 to N1−1 and y ranges from 0 to N2−1;
    the plane d(x, y) being associated with three plane points ($p_0$, $p_1$, $p_2$) such that $$\alpha = \frac{p_1 - p_0}{N1 - 1} \quad \beta = \frac{p_2 - p_0}{N2 - 1} \quad \gamma = p_0;$$

determining an order of coding of the sub-blocks;
    while encoding consecutive sub-blocks:
        calculating predictors ($\hat{p}_0$, $\hat{p}_1$, $\hat{p}_2$) for the plane points ($p_0$, $p_1$, $p_2$) of the currently-encoded sub-block (C) as the value of the depth map corresponding to the extension of plane defined for an adjacent sub-block that has been earlier encoded according to the determined order of coding;
        calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$);
        providing the parameters of the plane for the currently-encoded sub-block (C) in form of the differences ($\Delta p_0$, $\Delta p_1$, $\Delta p_2$); and
    providing an encoded depth map in a form of a set of planes d(x,y) defined by parameters.

2. The method according to claim 1, comprising calculating predictors ($\hat{p}_0$, $\hat{p}_1$, $\hat{p}_2$) for the plane points ($p_0$, $p_1$, $p_2$) of the currently-encoded sub-block (C) on the basis of the values of the plane points ($p^R_0$, $p^R_1$, $p^R_2$) for planes corresponding to earlier-encoded sub-blocks.

3. The method according to claim 2, wherein the earlier-encoded sub-blocks are adjacent to the currently encoded sub-block.

4. The method according to claim 3, wherein R∈{LT, L, LB, T, RT}, wherein LT indicates a Left-Top sub-block, L indicates a Left sub-block, LB indicates a Left-Bottom sub-block, T indicates a Top sub-block and RT indicates a Right-Top sub-block.

5. The method according to claim 1, comprising specifying predictors ($\hat{p}_0$, $\hat{p}_1$, $\hat{p}_2$) for the plane points ($p_0$, $p_1$, $p_2$) of the currently-encoded sub-block (C) on the basis of a predefined value.

6. The method according to claim 1, wherein the order of coding of the sub-blocks is selected from the group comprising: z-order, raster scan order, diagonal scan order, zigzag scan order.

7. The method according to claim 1, wherein the sub-blocks have a rectangular shape with a size of N1×N2, wherein at least one of N1, N2 is higher than 1.

8. The method according to claim 7, wherein the sub-blocks have a square shape.

9. A computing device non-transitory program product for depth-image-based rendering, the computing device program product comprising:
   a non-transitory computer readable medium;
   first programmatic instructions for receiving a depth map;
   second programmatic instructions for dividing the depth map to blocks;
   third programmatic instructions for performing quad-tree decomposition of the depth map to sub-blocks having a size of N1×N2 points wherein N1, N2 are higher than 1;
   fourth programmatic instructions for approximating each of the sub-blocks by a plane d(x, y) described by an equation $$d(x,y) = \alpha \cdot x + \beta \cdot y + \gamma$$

wherein d(x, y) is the value of the plane at the point having coordinates (x, y) and wherein x ranges from 0 to N1−1 and y ranges from 0 to N2−1;
   the plane d(x, y) being associated with three plane points ($p_0$, $p_1$, $p_2$) such that $$\alpha = \frac{p_1 - p_0}{N1 - 1} \quad \beta = \frac{p_2 - p_0}{N2 - 1} \quad \gamma = p_0$$

fifth programmatic instructions for determining an order of coding of the sub-blocks;
   sixth programmatic instructions for, while encoding consecutive sub-blocks:
   calculating predictors ($\hat{p}_0$, $\hat{p}_1$, $\hat{p}_2$) for the plane points ($p_0$, $p_1$, $p_2$) of the currently-encoded sub-block (C) as the value of the depth map corresponding to the extension of plane defined for an adjacent sub-block that has been earlier encoded according to the determined order of coding;
   calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$);
   providing the parameters of the plane for the currently-encoded sub-block (C) in form of the differences ($\Delta p_0$, $\Delta p_1$, $\Delta p_2$); and
   seventh programmatic instructions for providing an encoded depth map in a form of a set of planes d(x, y) defined by parameters.

10. A system for predictive encoding of a depth map, the system comprising:
   a data bus communicatively coupling components of the system;
   a memory for storing data;
   a controller configured to perform the steps of:
   receiving a depth map;
   dividing the depth map to blocks;
   performing quad-tree decomposition of the depth map to sub-blocks having a size of N1×N2 points wherein N1, N2 are higher than 1;
   approximating each of the sub-blocks by a plane d(x, y) described by an equation $$d(x,y) = \alpha \cdot x + \beta \cdot y + \gamma$$

wherein d(x, y) is the value of the plane at the point having coordinates (x, y) and wherein x ranges from 0 to N1−1 and y ranges from 0 to N2−1:
   the plane d(x, y) being associated with three plane points ($p_0$, $p_1$, $p_2$) such that $$\alpha = \frac{p_1 - p_0}{N1 - 1} \quad \beta = \frac{p_2 - p_0}{N2 - 1} \quad \gamma = p_0;$$

determining an order of coding of the sub-blocks;
   while encoding consecutive sub-blocks:
   calculating predictors ($\hat{p}_0$, $\hat{p}_1$, $\hat{p}_2$) for the plane points ($p_0$, $p_1$, $p_2$) of the currently-encoded sub-block (C) as the value of the depth map corresponding to the extension of plane defined for an adjacent sub-block that has been earlier encoded according to the determined order of coding;
   calculating differences ($\Delta p_0$, $\Delta p_1$, $\Delta p_2$) between the actual values of the plane points ($p_0$, $p_1$, $p_2$) and the values of the corresponding predictors ($\hat{p}_0$, $\hat{p}_1$, $\hat{p}_2$);
   providing the parameters of the plane for the currently-encoded sub-block (C) in form of the differences ($\Delta p_0$, $\Delta p_1$, $\Delta p_2$); and
   providing an encoded depth map in a form of a set of planes d(x, y) defined by parameters.

* * * * *

UNITED STATES PATENT AND TRADEMARK OFFICE
CERTIFICATE OF CORRECTION

| | | |
|---|---|---|
| PATENT NO. | : 9,848,205 B2 | Page 1 of 1 |
| APPLICATION NO. | : 14/753011 | |
| DATED | : December 19, 2017 | |
| INVENTOR(S) | : Marek Domanski et al. | |

It is certified that error appears in the above-identified patent and that said Letters Patent is hereby corrected as shown below:

In the Claims

Claim 1, Column 6 should be corrected as follows:
Line 39: Change:
-- and $^y$ ranges --
To:
"and $y$ ranges"

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*